US 7,774,384 B2

(12) United States Patent
Kortum et al.

(10) Patent No.: US 7,774,384 B2
(45) Date of Patent: Aug. 10, 2010

(54) OBTAINING USER FEEDBACK FOR UNAVAILABLE CONTENT

(75) Inventors: Philip Ted Kortum, Austin, TX (US); Marc Andrew Sullivan, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 407 days.

(21) Appl. No.: 11/137,683

(22) Filed: May 25, 2005

(65) Prior Publication Data

US 2006/0271516 A1  Nov. 30, 2006

(51) Int. Cl.
G06F 17/30 (2006.01)
(52) U.S. Cl. ............... 707/805; 707/913; 707/938; 707/939; 707/944; 707/E17.064; 705/59; 709/219; 715/716
(58) Field of Classification Search ............ 707/3, 707/10, 100, 102, 104.1; 705/26; 725/31
See application file for complete search history.

(56) References Cited

U.S. PATENT DOCUMENTS

| 5,903,892 | A | * | 5/1999 | Hoffert et al. ............... 1/1 |
| 5,915,019 | A | * | 6/1999 | Ginter et al. .............. 705/54 |
| 5,956,716 | A | * | 9/1999 | Kenner et al. ............. 707/10 |
| 5,982,891 | A | * | 11/1999 | Ginter et al. .............. 705/54 |
| 6,226,618 | B1 | * | 5/2001 | Downs et al. ............... 705/1 |
| 6,243,328 | B1 | * | 6/2001 | Fenner et al. ........... 707/104.1 |
| 6,247,022 | B1 | * | 6/2001 | Yankowski ............. 707/104.1 |
| 6,574,609 | B1 | * | 6/2003 | Downs et al. .............. 705/50 |
| 6,587,837 | B1 | * | 7/2003 | Spagna et al. ............. 705/26 |
| 6,748,395 | B1 | * | 6/2004 | Picker et al. ............. 707/102 |
| 6,850,252 | B1 | * | 2/2005 | Hoffberg ................. 715/716 |
| 7,181,438 | B1 | * | 2/2007 | Szabo ...................... 707/2 |
| 7,206,748 | B1 | * | 4/2007 | Gruse et al. ............... 705/1 |
| 7,213,005 | B2 | * | 5/2007 | Mourad et .............. 705/64 |
| 7,277,928 | B2 | * | 10/2007 | Lennon ................ 709/219 |
| 7,281,034 | B1 | * | 10/2007 | Eyal ..................... 709/219 |
| 2001/0054009 | A1 | * | 12/2001 | Miller et al. .............. 705/26 |
| 2001/0056434 | A1 | * | 12/2001 | Kaplan et al. .......... 707/104.1 |

(Continued)

OTHER PUBLICATIONS

Olson, Eric M., Rhapsody: It'll change the way you listen to music, Aug. 17, 2003, BestBuy.com, pp. 1-6.*

(Continued)

*Primary Examiner*—Pierre M Vital
*Assistant Examiner*—Christopher P Nofal
(74) *Attorney, Agent, or Firm*—Toler Law Group

(57) ABSTRACT

A content provider has an associated database. The database is indexed with a plurality of content items available in a domain. The database includes a field to indicate an availability of each of the content items from the content provider. The database is searched based on a search query entered by a user to generate a search result list. The search result list may include a content item that is identified as being unavailable from the content provider based on the field. If so, the search result list is provided to the user to indicate the content item and to indicate that the content item is unavailable from the content provider. A user feedback control associated with the content item is also provided to the user. The user feedback control is to provide feedback from the user if the user desires the content provider to make the content item available.

19 Claims, 3 Drawing Sheets

U.S. PATENT DOCUMENTS

| | | | |
|---|---|---|---|
| 2002/0073101 A1* | 6/2002 | Stoyen | 707/104.1 |
| 2002/0147725 A1* | 10/2002 | Janssen et al. | 707/100 |
| 2002/0194081 A1* | 12/2002 | Perkowski | 705/26 |
| 2003/0056212 A1* | 3/2003 | Siegel et al. | 725/31 |
| 2003/0120557 A1* | 6/2003 | Evans et al. | 705/26 |
| 2003/0130984 A1* | 7/2003 | Quinlan et al. | 707/1 |
| 2003/0149642 A1* | 8/2003 | Perkowski | 705/27 |
| 2004/0148344 A1* | 7/2004 | Navar et al. | 709/203 |
| 2004/0199575 A1* | 10/2004 | Geller | 709/201 |
| 2005/0108754 A1* | 5/2005 | Carhart et al. | 725/47 |
| 2006/0085521 A1* | 4/2006 | Sztybel | 709/219 |
| 2007/0094363 A1* | 4/2007 | Yruski et al. | 709/220 |
| 2008/0250120 A1* | 10/2008 | Mick et al. | 709/219 |
| 2009/0113300 A1* | 4/2009 | Tuli | 715/716 |
| 2009/0228574 A1* | 9/2009 | Maures | 709/219 |
| 2010/0031366 A1* | 2/2010 | Knight et al. | 726/26 |

OTHER PUBLICATIONS

"Software Development", Apr. 14, 2004, Wikipedia via Wayback Machine, Internet Archive, pp. 1-3.*

"Rhapsody (Online music service)", Aug. 1, 2004, Wikipedia via Wayback Machine, Internet Archive, pp. 1-6.*

Andy Breeding, "The Music Internet Untangled: Using Online Music Services to Expand Your Musical Horizons", Oct. 1, 2004, Giant Path Publishing, pp. 1-212.*

Ben McConnell, "Fight the Fear: The 10 Golden Rules of Customer Feedback", Mar. 2, 2004, MarketingProfs, pp. 1-2.*

* cited by examiner

```
Benjamin Harrison
William McKinley[6]
John Calvin Coolidge, Jr.
Herbert Clark Hoover
Franklin Delano Roosevelt[3]
Ronald Wilson Reagan
George Walker Bush
James Monroe
```

FIG. 3

```
George Washington
John Adams                      Benjamin Harrison
Thomas Jefferson                Stephen Grover Cleveland
James Madison                   William McKinley[6]
James Monroe                    Theodore Roosevelt, Jr.
John Quincy Adams               William Howard Taft
Andrew Jackson                  Thomas Woodrow Wilson
Martin Van Buren                Warren Gamaliel Harding[3]
William Henry Harrison[3]       John Calvin Coolidge, Jr.
John Tyler                      Herbert Clark Hoover
James Knox Polk                 Franklin Delano Roosevelt[3]
Zachary Taylor[3]               Harry S. Truman
Millard Fillmore                Dwight David Eisenhower
Franklin Pierce                 John Fitzgerald Kennedy[6]
James Buchanan                  Lyndon Baines Johnson
Abraham Lincoln[6]              Richard Milhous Nixon[8]
Andrew Johnson                  Gerald Rudolph Ford, Jr.
Ulysses Simpson Grant           James Earl "Jimmy" Carter, Jr.
Rutherford Birchard Hayes       Ronald Wilson Reagan
James Abram Garfield[6]         George Herbert Walker Bush
Chester Alan Arthur             William Jefferson Clinton
Stephen Grover Cleveland        George Walker Bush
```

| SEARCH QUERY | RESULT |
|---|---|
| bush | George Walker Bush |
| George Bush | George Walker Bush |
| George HW Bush | No result |
| George Bush Sr. | No Result |
| <Subject gives up> | |

FIG. 6

| SEARCH QUERY | RESULT |
|---|---|
| bush | George Walker Bush<br>George Herbert Walker Bush<br>(content not available) |
| <Subject ends search> | |

OBTAINING USER FEEDBACK FOR UNAVAILABLE CONTENT

FIELD OF THE DISCLOSURE

The present disclosure relates to search methods and systems.

BACKGROUND

Search engines are operative to search databases for specific strings of text and/or symbols that match input queries from users. Content providers provide search engines to search databases of all items they can supply to their users or all items their users are authorized to access.

In some cases, a null or blank search return may be generated based on a search string entered by a user. The user may interpret the null or blank search result in multiple ways. The user may surmise that the search string was insufficient and/or not well formed, in which case a reformulated search string needs to be entered. Alternatively, the user may surmise that an item for which he/she is searching does not exist in the database, in which case no further manipulation of the search string will yield an intended search result.

Many users assume that their search string was insufficient if a null or blank search result is generated. These users may spend additional time trying to reform the search query and perform additional searches, which will be unsuccessful if their desired items do not exist in the database. The users may give up after multiple unsuccessful inquiries with the belief that the item did exist in the database but that they were simply unable to construct the correct search query to locate the item.

Some search engines, such as GOOGLE®, store cached versions of some Web content. If a cached version of a search result is stored by the search engine, the search engine may return both a hyperlink to the search result and a hyperlink to the cached version on a search results page. The search results page from GOOGLE® also provides a "Dissatisfied? Help us improve" hyperlink. This hyperlink directs the user to a Web page having a first text box for the user to enter his/her comments on what specific information he/she was seeking and/or why he/she was dissatisfied with the search results. The Web page has a second text box for the user to enter a specific Uniform Resource Locator (URL) that was not listed in the search results. GOOGLE® states on the Web page that the information entered by the user will be reviewed by a quality team.

Accordingly, there is a need for an improved method and system of communicating using computer network addresses.

BRIEF DESCRIPTION OF THE DRAWINGS

FIG. 3 is list of U.S. Presidents for which a hypothetical content provider has associated content items;

FIG. 4 is an exhaustive list of U.S. Presidents which index a database of the hypothetical content provider;

FIG. 5 is a sequence of hypothetical search queries and search results if the content provider's database indexed only the U.S. Presidents listed in FIG. 3; and FIG. 6 is a sequence of hypothetical search queries and search results if the content provider's database indexed the U.S. Presidents listed in FIG. 4 and indicated availability based on the U.S. Presidents listed in FIG. 3.

DETAILED DESCRIPTION

Figure 1:
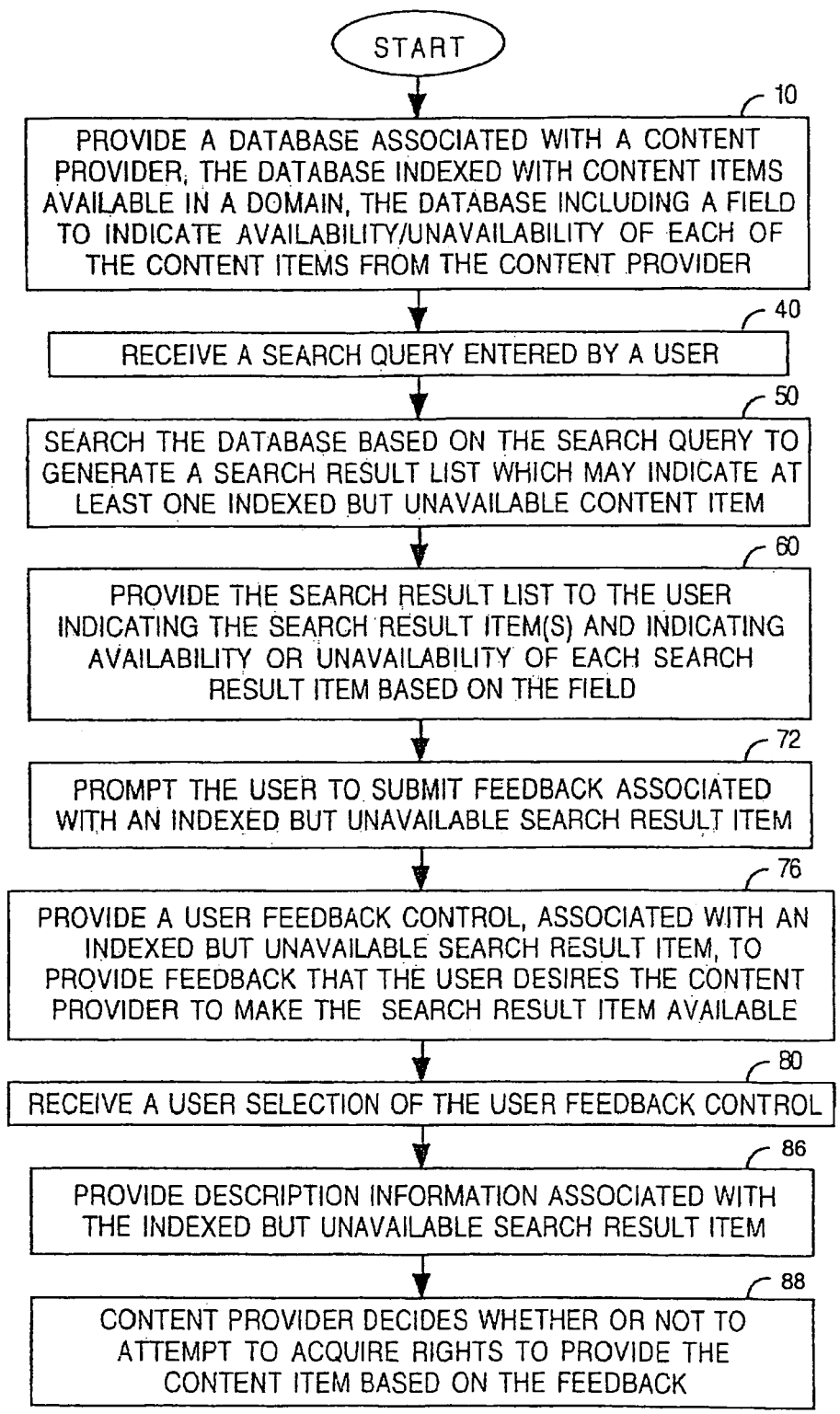
FIG. 1 is a flow chart of an embodiment of a method of searching incomplete lists.
Figure 2:
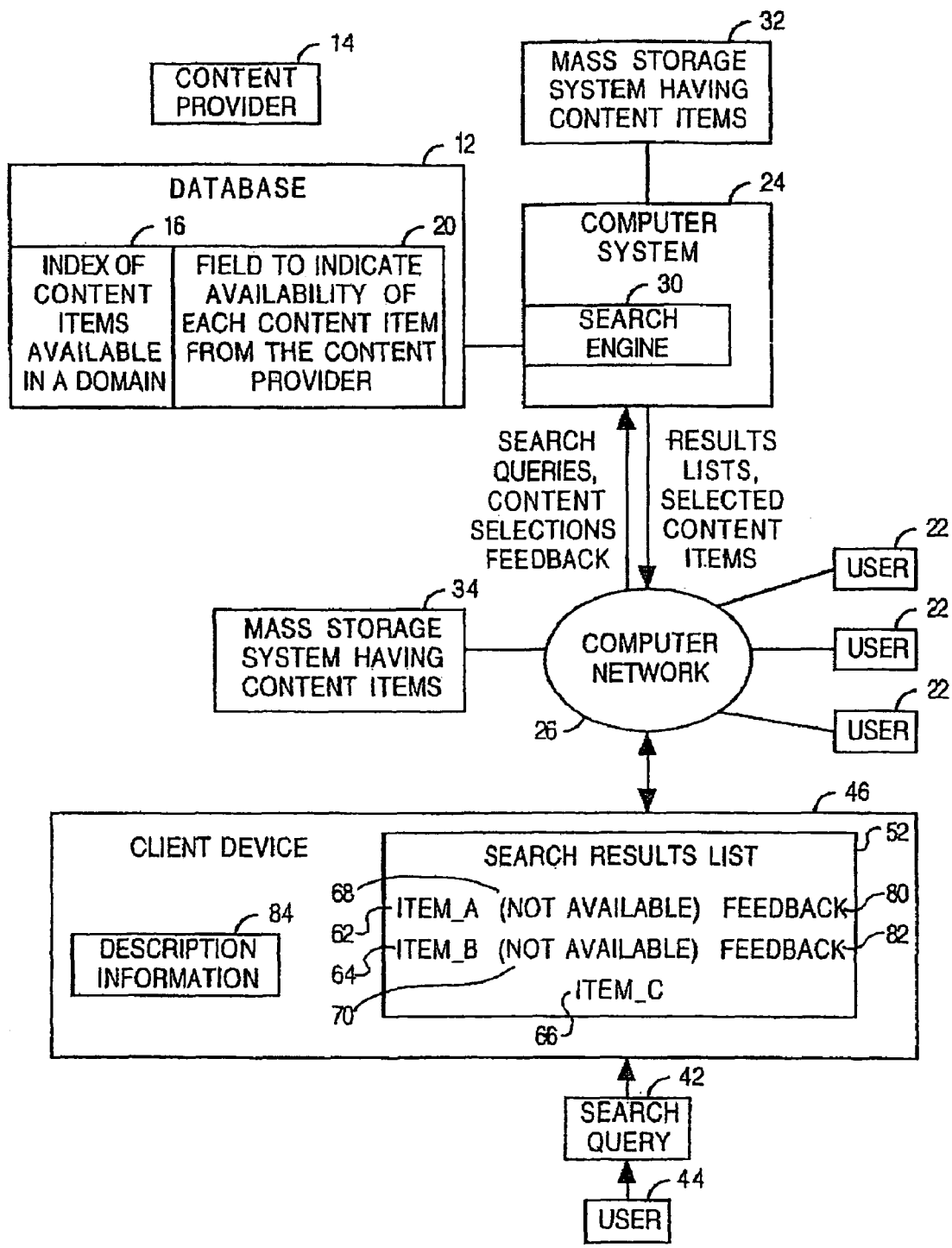
FIG. 2 is a block diagram of an embodiment of a system for searching incomplete lists.

Embodiments of the present invention address the above-described user perception problem associated with a null or blank search result generated by a search engine. Embodiments are described with reference to FIG. 1, which is a flow chart of an embodiment of a method of searching incomplete lists, and FIG. 2, which is a block diagram of an embodiment of a system for searching incomplete lists.

As indicated by block 10, the method comprises providing a database 12 associated with a content provider 14. The database 12 is indexed with a plurality of content items 16 available in a domain. Examples of the domain include, but are not limited to, cinematic movie titles, television programs, and recorded music titles. The database 12 may be indexed with either most, substantially all or all content items that fall within the domain.

The database 12 includes a field 20 to indicate an availability of each of the content items 16 from the content provider 14. The field 20 is beneficial because the content provider 14 may have access to only a subset of the content items 16 in the domain, and thus may not have access to some of the content items 16 in the domain.

For purposes of illustration and example, consider the content provider 14 making available content items that include a plurality of cinematic movies. In this case, the database 12 may be indexed with substantially all cinematic movie titles. The content provider 14, however, may have secured rights to provide only a subset of the cinematic movies. For each of the cinematic movies in the domain, the field 20 indicates whether or not the cinematic movie can be provided by the content provider 14.

In general, the content provider 14 may be a provider of video-on-demand (e.g. stored television programs, cinematic movies), audio-on-demand (e.g. stored music), Web content, or any combination thereof for multiple users 22. The content provider 14 has a computer system 24 that receives requests for content items from different ones of the users 22 via a computer network 26. If a requested content item is available from the content provider 14, the computer system 24 serves the requested content item to its associated user via the computer network 26. The content provider 14 may bill the user for serving the requested content item. The computer system 24 also provides a search engine 30 to enable the users 22 to search the database 12.

A content item is considered to be available from the content provider 14 if the content provider 14 can satisfy a request for the content item. The computer system 24 may satisfy the request by retrieving the content item from either a mass storage system 32 of the content provider 14 or a mass storage system 34 of a third party, and communicating the content item to the requesting user via the computer network 26.

As indicated by block 40, the method comprises receiving a search query 42 entered by a user 44. The user 44 enters the search query 42 using a client device 46 such as a computer, a set-top box, or a personal digital assistant. The search query 42 is communicated by the client device 46 to the computer system 24 via the computer network 26. Examples of the computer network 26 include, but are not limited to, an Internet, an intranet, an extranet, a local area network, a wide area network, a satellite network, a digital subscriber line network and a cable-modem-based network.

As indicated by block 50, the method comprises the search engine 30 searching the database 12 based on the search query 42 to generate a search result list 52. The search result list 52 includes those of the content items in the domain that either match or are sufficiently relevant to the search query. The search result list 52 may include either zero, one or a plurality of content items that are identified as being available from content provider 14 based on the field 20, and may include either zero, one or a plurality of content items that are identified as being unavailable from the content provider 14 based on the field 20. In some cases, the search result list 52 may be absent all content items indicated as being available from the content provider 14 based on the field 20.

As indicated by block 60, the method comprises providing the search result list 52 to the user 44. The search result list 52 may be communicated in the form of one or more display pages from the computer system 24 to the client device 46 via the computer network 26. The one or more display pages are displayed by the client device 46 for view by the user 44. The search results list 52 indicates to the user 44 those of the content items that match or are sufficiently relevant to the search query 42. The search results list 52 further indicates to the user 44 the availability or unavailability of each search result item from the content provider 14.

For purposes of illustration and example, consider the search results list 52 including an indication 62 of a first content item, an indication 64 of a second content item, and an indication 66 of a third content item. Consider the first content item and the second content item being unavailable from the content provider 14, but the third content item being available from the content provider 14. This scenario would occur if the search query 42 is "die hard" and if the content provider 14 cannot provide the movies "Die Hard 2" and "Die Hard With a Vengeance" but can provide the first "Die Hard" movie. The search results list 52 includes an indication 68 that the first content item is unavailable from the content provider 14, and an indication 70 that the second content item is unavailable from the content provider 14. Each of the indications 68 and 70 may be textual such as "content not available".

The user 44 can request an available content item by selecting the item from the search results list 52 using the client device 46. The selection is communicated from the client device 46 to the computer system 24 via the computer network 26. The computer system 24 receives the selection, retrieves the selected content item, and communicates the selected content item to the client device 46 via the computer network 26. The client device 46 displays the selected content item to the user 44.

Regardless of whether or not the user 44 makes a request for an available content item as described above, the herein-disclosed method and system are capable of handling unavailable content items in the manner described below.

As indicated by block 72, the method optionally comprises prompting the user to submit feedback associated with a content item indicated as being unavailable from the content provider 14. This act may comprise textually prompting the user on the one or more display pages for feedback if he/she desires an unavailable content item and/or desires the content provider 14 to make the content item available (e.g. by securing the rights to provide the content item). Examples of a textual prompt include "click here to indicate your desire for this unavailable content item", "click here if you want the content provider to make this content item available", or "click here if you want the content provider to secure rights to provide this content item".

As indicated by block 76, the method comprises providing a user feedback control associated with a content item indicated as being unavailable from the content provider 14. The user feedback control may be provided by a user-selectable region (e.g. a hyperlink, a graphical button, or a check box) on the one or more display pages. The user feedback control is to provide feedback that the user 44 desires an unavailable content item and/or desires the content provider 14 to make the content item available. The user 44 can enter his/her feedback via the user feedback control using the client device 46. The user-entered feedback is communicated from the client device 46 to the content provider 14 via the computer network 26.

In one embodiment, each unavailable content item in the search results list 52 has its own associated user feedback control dedicated thereto. For example, the one or more display pages may provide a first user feedback control 80 associated with and dedicated to the first content item (which is unavailable), and a second user feedback control 82 associated with and dedicated to the second content item (which is unavailable). Since the third content item is available, the one or more display pages need not provide this type of user feedback control for the third content item.

As indicated by block 80, the computer system 24 may receive a user selection of a user feedback control associated with an unavailable content item. As indicated by block 86, the computer system 24 may provide description information 84 associated with the unavailable content item in response to the user selection. The descriptive information 84 may comprise a trailer of a cinematic movie, textual information about a cinematic movie (e.g. its title, copyright date, writer(s), actor(s), director(s), producer(s) and a short summary), textual information about a song (e.g. its title, copyright date, artist(s), songwriter(s), etc.).

As indicated by block 88, the content provider 14 can decide whether or not to attempt to acquire rights to provide the content item based on feedback from the user 44 and other users. In general, the content provider 14 can decide whether or not to attempt to acquire rights to provide a content item either with or without feedback from one or more users. For example, the content provider 14 can decide whether or not to attempt to acquire rights to provide a content item based on the content item being included as an unavailable content item in one or more search result lists for one or more users (with or without feedback from the one or more users). Regardless of how the decision to attempt to acquire rights to an unavailable content item is made, the content provider 14 can make the decision in either an automated manner (e.g. by part of the computer system 24 programmed to analyze the search result list(s) for frequent inclusion of the unavailable content item and/or to analyze the user feedback for frequent positive feedback associated with the unavailable content item) and/or a manual manner (e.g. by one or more humans who view the search result list(s) and/or the user feedback from the computer system 24 and analyze the data as described above).

The herein-disclosed method and system enable a content provider to provide a positive hit to a user for a piece of content that the content provider cannot currently supply. In contrast, a typical content provider populates its search database only with content items that it can provide to its users. By receiving a positive hit on an unavailable item, the user can be certain that the content does not exist on the provider's service and can quickly terminate further searches or re-inquiry efforts. Further, as the user uses the system, his/her confidence in search results grows because he/she recognizes that the return of the search hit is not dependent on trying to guess what the provider may or may not have. Still further, users can be prompted to send feedback to the provider on these negative results (e.g. content not available for viewing). The provider can fine tune its content offerings based on direct user input indicating which content items would be desirable.

FIGS. 3-6 illustrate an example showing benefits of the herein-disclosed method and system for use with a domain of U.S. Presidents. FIG. 3 is list of U.S. Presidents for which a hypothetical content provider has associated content items. The database of the content provider is indexed with an exhaustive list of U.S. Presidents, as shown in FIG. 4. The database includes a field to indicate that the content provider has content for the U.S. Presidents listed in FIG. 3, but not for the other U.S. Presidents. Absent the teachings herein, the content provider's database would index only the U.S. Presidents listed in FIG. 3.

FIGS. 5 and 6 illustrate sequences of hypothetical user-entered search queries for a user searching for content associated with George Herbert Walker Bush, the $41^{st}$ President. FIG. 5 is a sequence if the content provider's database indexed only the U.S. Presidents listed in FIG. 3. The user may enter a first search query of "bush" in which case a search result of "George Walker Bush" is returned. Since George Walker Bush is not the $41^{st}$ President but is the $43^{rd}$ President, the user may enter a second search query of "George Bush". Once again, a search result of "George Walker Bush" is returned. The user may enter a third search query of "George HW Bush" in which case no result is returned. The user may enter a fourth search query of "George Bush Sr.", in which case no result is returned. At this point, after entering four search queries, the user may give up on his/her search.

FIG. 6 is a sequence if the content provider's database indexed the U.S. Presidents listed in FIG. 4 and indicated availability based on the U.S. Presidents listed in FIG. 3. The user may enter a first search query of "bush" in which case search results of "George Walker Bush" and "George Herbert Walker Bush (content not available)" are returned. After entering only one search query, the user knows that he/she entered a proper query but that the target content is unavailable from the content provider.

The herein-described components of the computer system 24 may be embodied by one or more computer processors directed by computer-readable program code stored by a computer-readable medium. The herein-described components of the client device 46 may be embodied by one or more computer processors directed by computer-readable program code stored by a computer-readable medium.

Each of the database 12 and the mass storage devices 32 and 34 may comprise its own computer-readable media to store computer-readable data and/or content items in a computer-readable form.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computer-implemented method comprising:
    querying a database associated with a content provider based on a search query received at a set-top box device, wherein the database includes a plurality of entries, each entry corresponding to a content item and each entry having an associated field to indicate an availability of the content item from the content provider;
    providing a list of content items, wherein the list of content items includes a first entry associated with a first content item;
    when the first content item is unavailable from the content provider:
        providing a media preview of the first content item in response to a selection of the first entry;
        including a first user feedback control in the list of content items, wherein the first user feedback control is associated with the first content item and wherein the first user feedback control is configured to receive a request that the content provider make the first content item available; and
        prompting a user to submit the request via the first user feedback control;
    automatically determining to acquire rights to provide access to the first content item based at least in part on a frequency of inclusion of the first content item in search queries and feedback obtained from the first user feedback control and associated with the first content item; and
    automatically making the first content item available based on the determining.

2. The computer-implemented method of claim 1, further comprising:
    including a second user feedback control associated with a second content item in the list of content items, the second user feedback control to receive a request that the content provider make the second content item available.

3. The computer-implemented method of claim 1, wherein the first content item is a first cinematic movie.

4. The computer-implemented method of claim 3, wherein the media preview is a trailer associated with the first cinematic movie.

5. The computer-implemented method of claim 4, wherein the user is prompted to submit the request via a text input of the first user feedback control.

6. The computer-implemented method of claim 1, wherein the list of content items includes a plurality of content items and a plurality of entries, wherein each particular content item has a corresponding entry indicating the availability of the particular content item from the content provider.

7. The computer-implemented method of claim 1, wherein the determining is further based on a frequency of inclusion of the first content item in lists of content items.

8. The computer-implemented method of claim 1, wherein the first content item is an on-demand content item.

9. The computer-implemented method of claim 1, wherein the first content item is a television program.

10. The computer-implemented method of claim 1, wherein the first content item is an audio recording.

11. The computer-implemented method of claim 1, wherein the media preview comprises audio content, video content, or any combination thereof.

12. A set-top box device comprising:
    a processor; and
    a memory, wherein the memory comprises instructions, that when executed, cause the processor to:
        query a database associated with a content provider based on a search query, the database comprising a plurality of entries, each entry corresponding to a content item and each entry having an associated field to indicate an availability of the content item from the content provider;

provide a list of content items, wherein the search of content items includes a first entry associated with a first content item;

when the first content item is unavailable from the content provider:

provide a media preview of the first content item in response to a selection of the first entry;

include a first user feedback control in the list of content items, wherein the first user feedback control is associated with the first content item and wherein the first user feedback control is configured to receive a request that the content provider make the first content item available; and prompt a user to submit the request via the first user feedback control; and indicate that the first content item is made available by the content provider;

wherein a frequency of inclusion of the first content item in search queries and feedback obtained from the first user feedback control and associated with the first content item are used in part by the content provider to determine to make the first content item available.

13. The set-top box device of claim 12, wherein the list of content items includes a second entry associated with a second content item, wherein when the second entry indicates that the second item is unavailable from the content provider, and wherein the memory further comprises instructions, that when executed, cause the processor to include a second user feedback control associated with the second content item in the list of content items, the second user feedback control configured to receive second feedback requesting that the content provider make the second content item available.

14. The set-top box device of claim 12, wherein the first content item is a cinematic movie.

15. The set-top box device of claim 14, wherein the media preview comprises a trailer associated with the cinematic movie.

16. A computer-readable storage medium having computer-readable program code to cause a computer system to:

store a plurality of entries in a database, each entry corresponding to a content item and each entry having an associated field to indicate an availability of the content item from a content provider;

query the database base on a search query received at a set-top box device;

provide a list of content items, wherein the list of content items includes a first entry associated with a first content item;

when the first content item is unavailable:

provide a media preview of the first content item in response to a selection of the first entry;

include a first user feedback control in the list of content items, wherein the first user feedback control is associated with the first content item and wherein the first user feedback control is configured to receive a request that the first content item be made available; and prompt a user to submit the request that via the first user feedback control;

automatically determine to initiate a request to acquire rights to provide access to the first content item based at least in part on a frequency of inclusion of the first content item in search queries and feedback obtained from the first user feedback control and associated with the first content item; and automatically make the first content available based on the determining.

17. The computer-readable storage medium of claim 16, wherein the computer-readable program code further causes the computer system to:

include a second user feedback control associated with a second content item in the list of content items, the second user feedback control configured to receive a request that the second content item be made available.

18. The computer-readable storage medium of claim 16, wherein the first content item includes a music item.

19. The computer-readable storage medium of claim 16, wherein automatically making the first content item available comprises automatically acquiring rights to provide access to the first content item.

* * * * *